United States Patent
Mucignat et al.

(10) Patent No.: US 8,392,735 B2
(45) Date of Patent: Mar. 5, 2013

(54) MOTION SENSOR DATA PROCESSING USING VARIOUS POWER MANAGEMENT MODES

(75) Inventors: Andrea Mucignat, Burlingame, CA (US); Saurabh Gupta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/561,412

(22) Filed: Jul. 30, 2012

(65) Prior Publication Data

US 2012/0297226 A1    Nov. 22, 2012

Related U.S. Application Data

(60) Division of application No. 12/975,558, filed on Dec. 22, 2010, now Pat. No. 8,234,512, which is a continuation of application No. 12/552,385, filed on Sep. 2, 2009, now Pat. No. 7,873,849.

(51) Int. Cl.
  *G06F 1/32* (2006.01)
(52) U.S. Cl. ......... 713/323; 713/300; 713/320; 713/324
(58) Field of Classification Search .................. 713/300, 713/320, 323, 324
  See application file for complete search history.

(56) References Cited

U.S. PATENT DOCUMENTS

| | | | |
|---|---|---|---|
| 5,471,405 A | 11/1995 | Marsh | |
| 5,953,677 A | 9/1999 | Sato | |
| 6,013,007 A | 1/2000 | Root et al. | |
| 6,032,108 A | 2/2000 | Seiple et al. | |
| 6,135,951 A | 10/2000 | Richardson et al. | |
| 6,357,147 B1 | 3/2002 | Darley et al. | |
| 6,463,385 B1 | 10/2002 | Fry | |
| 6,473,630 B1 | 10/2002 | Baranowski et al. | |
| 6,535,983 B1 | 3/2003 | McCormack et al. | |
| 6,539,336 B1 | 3/2003 | Vock et al. | |
| 6,560,903 B1 | 5/2003 | Darley | |
| 6,582,342 B2 | 6/2003 | Kaufman | |
| 6,619,835 B2 | 9/2003 | Kita | |
| 6,633,932 B1 | 10/2003 | Bork et al. | |
| 6,665,802 B1 | 12/2003 | Ober | |

(Continued)

FOREIGN PATENT DOCUMENTS

| | | |
|---|---|---|
| EP | 1619475 | 1/2006 |
| EP | 1736850 | 12/2006 |

(Continued)

OTHER PUBLICATIONS

Office Action (English translation) dated Aug. 31, 2012 in JP App. No. 2012-527878.

(Continued)

*Primary Examiner* — Vincent Tran
(74) *Attorney, Agent, or Firm* — Womble Carlyle Sandridge & Rice LLP

(57) ABSTRACT

Systems and methods for processing motion sensor data using various power management modes of an electronic device are provided. Power may be provided to a motion sensor during a first power mode of the device. In response to the motion sensor detecting a motion event with a magnitude exceeding a threshold, the sensor may transmit a wake up signal to a power management unit of the device. In response to receiving the wake up signal, the power management unit may switch the device to a second power mode. The device may provide power to a processor and load the processor with a motion sensing application when switching to the second power mode. During the second power mode, motion sensor data may be processed to determine that the motion event is not associated with an intentional user input and the device may return to the first power mode.

26 Claims, 7 Drawing Sheets

U.S. PATENT DOCUMENTS

| | | | |
|---|---|---|---|
| 6,716,139 B1 | 4/2004 | Hosseinzadeh-Dolkhani et al. |
| 6,790,178 B1 | 9/2004 | Mault et al. |
| 6,793,607 B2 | 9/2004 | Neil |
| 6,898,550 B1 | 5/2005 | Blackadar et al. |
| 7,030,735 B2 | 4/2006 | Chen |
| 7,062,225 B2 | 6/2006 | White |
| 7,145,454 B2 | 12/2006 | Linjama et al. |
| 7,171,331 B2 | 1/2007 | Vock et al. |
| 7,174,227 B2 | 2/2007 | Kobayashi et al. |
| 7,200,517 B2 | 4/2007 | Darley et al. |
| 7,251,454 B2 | 7/2007 | White |
| 7,278,966 B2 | 10/2007 | Hjelt et al. |
| 7,292,867 B2 | 11/2007 | Werner et al. |
| 7,324,833 B2 | 1/2008 | White et al. |
| 7,382,353 B2 | 6/2008 | Grady et al. |
| 7,408,506 B2 | 8/2008 | Miller |
| 7,454,002 B1 | 11/2008 | Gardner et al. |
| 7,519,327 B2 | 4/2009 | White |
| 7,618,345 B2 | 11/2009 | Corbalis et al. |
| 7,670,263 B2 | 3/2010 | Ellis et al. |
| 7,778,595 B2 | 8/2010 | White et al. |
| 2002/0077784 A1 | 6/2002 | Vock et al. |
| 2003/0097878 A1 | 5/2003 | Farringdon et al. |
| 2003/0159077 A1 | 8/2003 | Matsuo et al. |
| 2004/0181703 A1 | 9/2004 | Lilja et al. |
| 2005/0164633 A1 | 7/2005 | Linjama et al. |
| 2005/0172311 A1 | 8/2005 | Hjelt et al. |
| 2006/0161377 A1 | 7/2006 | Rakkola et al. |
| 2006/0242434 A1 | 10/2006 | Lee |
| 2007/0075965 A1 | 4/2007 | Huppi et al. |
| 2007/0223182 A1* | 9/2007 | Swan et al. ............ 361/679 |
| 2007/0271387 A1 | 11/2007 | Lydon et al. |
| 2007/0276295 A1* | 11/2007 | Shugg ............ 600/595 |
| 2008/0006762 A1 | 1/2008 | Fadell et al. |
| 2008/0008313 A1 | 1/2008 | Fyke |
| 2008/0140338 A1 | 6/2008 | No et al. |
| 2008/0266128 A1 | 10/2008 | Leone et al. |
| 2009/0096586 A1 | 4/2009 | Tubb |
| 2009/0319221 A1* | 12/2009 | Kahn et al. ............ 702/141 |
| 2010/0013778 A1 | 1/2010 | Liu et al. |
| 2010/0033424 A1 | 2/2010 | Kabasawa et al. |

FOREIGN PATENT DOCUMENTS

| | | |
|---|---|---|
| EP | 1785808 | 5/2007 |
| WO | WO 02/093272 | 11/2002 |
| WO | WO 2006070272 | 7/2006 |
| WO | WO 2009/008411 | 1/2009 |

OTHER PUBLICATIONS

Office Action (English translation) dated Sep. 12, 2012 in KR App. No. 10-2012-7008395.

* cited by examiner

MOTION SENSOR DATA PROCESSING USING VARIOUS POWER MANAGEMENT MODES

CROSS-REFERENCE TO RELATED APPLICATION

This is a divisional of commonly-assigned U.S. patent application Ser. No. 12/975,558, filed Dec. 22, 2010 (now U.S. Pat. No. 8,234,512), which is a continuation of commonly-assigned U.S. patent application Ser. No. 12/552,385, filed Sep. 2, 2009 (now U.S. Pat. No. 7,873,849), each of which is fully incorporated herein by reference.

FIELD OF THE INVENTION

This can relate to systems and methods for processing motion sensor data and, more particularly, to systems and methods for processing motion sensor data using various power management modes of an electronic device.

BACKGROUND OF THE DISCLOSURE

Electronic devices, and in particular portable electronic devices (e.g., portable media players and cellular telephones), often include one or more sensors for detecting characteristics of the device and its surroundings. For example, an electronic device may include one or more motion sensors, such as an accelerometer or gyroscope, for detecting the orientation and/or movement of the device. The electronic device may process the data generated by the motion sensors and may be operative to perform particular operations based on the processed motion sensor data. For example, an electronic device may process motion sensor data to determine the number of steps taken by a user carrying the device, thereby providing a pedometer application. This type of pedometer application may be utilized by the device over a long period of time in order to detect every step taken by a user, even when the user may not be actively interacting with the device. However, keeping certain device components active during utilization of such a pedometer application may consume a significant amount of the power available to the device.

SUMMARY OF THE DISCLOSURE

Systems, methods, and computer-readable media for processing motion sensor data using various power management modes of an electronic device are provided.

For example, in some embodiments, there is provided a method for controlling power consumption of an electronic device. The method may include providing power to a motion sensor of the device during a first inactive power mode of the device. Next, the method may include switching from the first inactive power mode to a first active power mode of the device in response to detecting a magnitude of a motion event that exceeds a threshold using the motion sensor. After the switching, the method may include returning from the first active power mode to the first inactive power mode in response to determining that the motion event is not associated with an intentional user input.

For example, the switching may include activating at least a portion of a processor of the device and loading the processor with a motion sensing application. The switching may also include instructing the processor to bypass a device component activation step of the application, such as a device component activation step that instructs the processor to at least partially activate a display output component of the device. The returning may include unloading the motion sensing application from the processor and deactivating at least a portion of the processor.

In other embodiments, there is provided a method for controlling power consumption of an electronic device. The method may include processing first motion sensor data for a first duration of time during a first active power mode of the device. Next, the method may include switching from the first active power mode to a first inactive power mode of the device in response to detecting that the first processed motion sensor data identifies a first motion event occurring a first number of times during the first duration of time at a first rate. Then, the method may include returning from the first inactive power mode to the first active power mode after a second duration of time. Next, the method may include processing second motion sensor data for a third duration of time and determining that the second processed motion sensor data identifies the first motion event occurring a second number of times during the third duration of time at the first rate. Finally, the method may include responding to a third number of the first motion event. The third number may equal the second number plus the product of the second duration of time and the rate.

For example, the second duration of time may be longer than the third duration of time. In some embodiments, the first motion event may be a user stepping event and the method may include storing the third number in a counter indicative of the amount of steps taken by a user of the device. In some embodiments, the switching from the first active power mode to the first inactive power mode may include unloading a motion sensing application from a processor of the device and deactivating at least a portion of the processor.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Systems, methods, and computer-readable media for processing motion sensor data using various power management modes of an electronic device are provided and described with reference to FIGS. 1-4.

An electronic device may be operative to receive motion sensor data generated by a motion sensor and the motion sensor data may be used to control a function of the electronic device. For example, a user of the device may perform a certain motion event (e.g., a walking event or a shaking event) that may cause the motion sensor to detect a particular movement and thereby generate particular motion sensor data. A motion sensing application may be utilized by the device to process the generated motion sensor data. For example, a processor running a motion sensing application may analyze the motion sensor data to distinguish the specific type of motion event that caused the motion sensor to generate the motion sensor data. Then the application may determine if that specific type of motion event is associated with an instruction to control a function of the device and, if so, the application may carry out that instruction.

The electronic device may be able to operate in various power management modes in order to conserve power during certain situations. For example, an electronic device may be configured to switch from an active power mode to a sleep power mode when certain device components have not been used and/or certain instructions have not been received within a certain period of time. Various components may be at least partially deactivated by the device when switching to the sleep mode. However, in some embodiments, a motion sensor may remain at least partially activated when the device is operating in a lower power mode, such as a sleep mode, so that certain user motion events may still be detected and appropriately utilized by the device. For example, a motion sensor may be utilized as a pedometer for continuously detecting user step motion events despite the device switching between various power management modes for conserving power.

Figure 1:
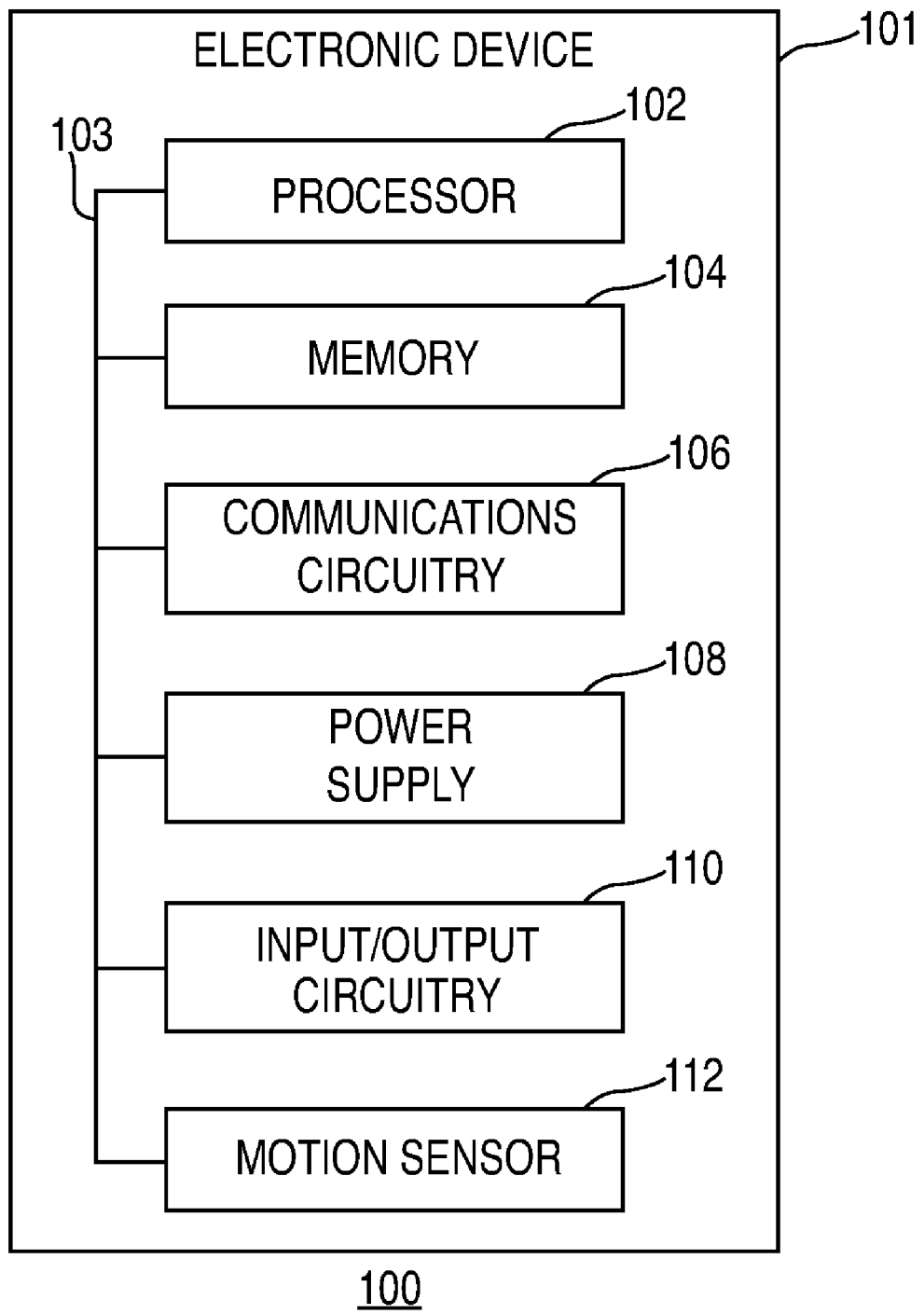
FIGS. 1 and 2 are schematic views of an illustrative electronic device in accordance with some embodiments of the invention.

FIG. 1 is a schematic view of an illustrative electronic device 100 for detecting a user's steps using one or more motion sensors in accordance with some embodiments of the invention. Electronic device 100 may perform a single function (e.g., a device dedicated to detecting a user's steps) and, in other embodiments, electronic device 100 may perform multiple functions (e.g., a device that detects a user's steps, plays music, and receives and transmits telephone calls). Moreover, in some embodiments, electronic device 100 may be any portable, mobile, or hand-held electronic device configured to detect a user's motions (e.g., steps) wherever the user travels. Electronic device 100 may include any suitable type of electronic device having one or more motion sensors operative to detect a user's motions. For example, electronic device 100 may include a media player (e.g., an iPod™ available by Apple Inc. of Cupertino, Calif.), a cellular telephone (e.g., an iPhone™ available by Apple Inc.), a personal e-mail or messaging device (e.g., a Blackberry™ available by Research In Motion Limited of Waterloo, Ontario), any other wireless communication device, a pocket-sized personal computer, a personal digital assistant ("PDA"), a laptop computer, a music recorder, a still camera, a movie or video camera or recorder, a radio, medical equipment, any other suitable type of electronic device, and any combinations thereof.

Electronic device 100 may include a processor or control circuitry 102, memory 104, communications circuitry 106, power supply 108, input/output ("I/O") circuitry 110, and one or more motion sensors 112. Electronic device 100 may also include a bus 103 that may provide a data transfer path for transferring data, to, from, or between various other components of device 100. In some embodiments, one or more components of electronic device 100 may be combined or omitted. Moreover, electronic device 100 may include other components not combined or included in FIG. 1. For example, electronic device 100 may also include various other types of components, including, but not limited to, light sensing circuitry, camera lens components, or global positioning circuitry, as well as several instances of one or more of the components shown in FIG. 1. For the sake of simplicity, only one of each of the components is shown in FIG. 1.

Electronic device 100 may also be provided with a housing 101 that may at least partially enclose one or more of the components of device 100 for protecting them from debris and other degrading forces external to device 100. In some embodiments, all of the components of electronic device 100 may be provided within the same housing 101. In other embodiments, one or more of the components may be provided within its own housing (e.g., a motion sensor 112 may be provided within its own housing and may communicate wirelessly or through a wire with a processor 102, which may be provided within its own housing).

Memory 104 may include one or more storage mediums, including, for example, a hard-drive, solid-state drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music, image, and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers (not shown) using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), cellular networks (e.g., GSM, AMPS, GPRS, CDMA, EV-DO, EDGE, 3GSM, DECT, IS-136/TDMA, iDen, LTE, or any other suitable cellular network or protocol), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), voice over internet protocol ("VOIP"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 can include any suitable circuitry for receiving and/or generating power, and for providing such power to one or more components of electronic device 100. In some embodiments, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). In some embodiments, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise).

The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

Input/output circuitry 110 may be operative to convert, and encode/decode, if necessary, analog signals and other signals into digital data. In some embodiments, I/O circuitry 110 may convert digital data into any other type of signal, and vice-versa. For example, I/O circuitry 110 may receive and convert physical contact inputs (e.g., using a multi-touch screen), physical movements (e.g., using a mouse or sensor), analog audio signals (e.g., using a microphone), or any other input. The digital data can be provided to and received from processor 102, memory 104, or any other component of electronic device 100. Although I/O circuitry 110 is illustrated in FIG. 1 as a single component of electronic device 100, several instances of I/O circuitry can be included in electronic device 100.

Input/output circuitry 110 may include any suitable mechanism or component for allowing a user to provide inputs for interacting or interfacing with electronic device 100. For example, an input component of I/O circuitry 110 may include any suitable user input component or mechanism and can take a variety of forms, including, but not limited to, an electronic device pad, dial, click wheel, scroll wheel, touch screen, one or more buttons (e.g., a keyboard), mouse, joy stick, track ball, and combinations thereof. In some embodiments, I/O circuitry 110 may include a multi-touch screen. Each input component of I/O circuitry 110 can be configured to provide one or more dedicated control functions for making selections or issuing commands associated with operating electronic device 100.

Input/output circuitry 110 may also include any suitable output mechanism or component for presenting information (e.g., textual, graphical, audible, and/or tactile information) to a user of electronic device 100. For example, I/O circuitry 110 may include any suitable output component or mechanism and can take a variety of forms, including, but not limited to, audio speakers, headphones, audio line-outs, visual displays, antennas, infrared ports, rumblers, vibrators, or combinations thereof.

In some embodiments, I/O circuitry 110 may include image display circuitry (e.g., a screen or projection system) as an output component for providing a display visible to the user. For example, the display circuitry may include a screen (e.g., a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof) that is incorporated in electronic device 100. As another example, the display circuitry may include a movable display or a projecting system for providing a display of content on a surface remote from electronic device 100 (e.g., a video projector, a head-up display, or a three-dimensional (e.g., holographic) display).

In some embodiments, display circuitry of I/O circuitry 110 can include a coder/decoder ("CODEC") to convert digital media data into analog signals. For example, the display circuitry, or other appropriate circuitry within electronic device 100, may include video CODECS, audio CODECS, or any other suitable type of CODEC. Display circuitry also can include display driver circuitry, circuitry for driving display drivers, or both. The display circuitry may be operative to display content (e.g., media playback information, application screens for applications implemented on the electronic device, information regarding ongoing communications operations, information regarding incoming communications requests, or device operation screens) under the direction of processor 102.

It should be noted that one or more input components and one or more output components of I/O circuitry 110 may sometimes be referred to collectively herein as an I/O interface 110. It should also be noted that an input component and an output component of I/O circuitry 110 may sometimes be a single I/O component, such as a touch screen that may receive input information through a user's touch of a display screen and that may also provide visual information to a user via that same display screen.

Motion sensor 112 may include any suitable motion sensor operative to detect movements of electronic device 100. For example, motion sensor 112 may be operative to detect a motion event of a user carrying device 100. In some embodiments, motion sensor 112 may include one or more three-axis acceleration motion sensors (e.g., an accelerometer) operative to detect linear acceleration in three directions (i.e., the x or left/right direction, the y or up/down direction, and the z or forward/backward direction). As another example, motion sensor 112 may include one or more single-axis or two-axis acceleration motion sensors which may be operative to detect linear acceleration only along each of the x or left/right direction and the y or up/down direction, or along any other pair of directions. In some embodiments, motion sensor 112 may include an electrostatic capacitance (e.g., capacitance-coupling) accelerometer that is based on silicon micro-machined micro electro-mechanical systems ("MEMS") technology, including a heat-based MEMS type accelerometer, a piezo-electric type accelerometer, a piezoresistance type accelerometer, or any other suitable accelerometer.

In some embodiments, motion sensor 112 may be operative to directly detect rotation, rotational movement, angular displacement, tilt, position, orientation, motion along a non-linear (e.g., arcuate) path, or any other non-linear motions. For example, if motion sensor 112 is a linear motion sensor, additional processing may be used to indirectly detect some or all of the non-linear motions. For example, by comparing the linear output of motion sensor 112 with a gravity vector (i.e., a static acceleration), motion sensor 112 may be operative to calculate the tilt of electronic device 100 with respect to the y-axis. In some embodiments, motion sensor 112 may alternatively or additionally include one or more gyro-motion sensors or gyroscopes for detecting rotational movement. For example, motion sensor 112 may include a rotating or vibrating element. Although the following discussion generally describes sensing motion in the context of a three-axis accelerometer, it will be understood that the discussion may be applied to any suitable sensing mechanism or combination of sensing mechanisms provided by motion sensor 112 of electronic device 100 for generating motion sensor data in response to detecting movement.

Processor 102 may include any processing circuitry operative to control the operations and performance of electronic device 100. For example, processor 102 may be used to run operating system applications, firmware applications, media playback applications, media editing applications, or any other application. In some embodiments, processor 102 may receive input signals from an input component of I/O circuitry 110 and/or drive output signals through an output component (e.g., a display) of I/O circuitry 110. Processor 102 may load a user interface program (e.g., a program stored in memory 104 or another device or server) to determine how instructions or data received via an input component of I/O circuitry 110 or one or more motion sensors 112 may manipulate the way in which information is provided to the user via an output component of I/O circuitry 110. Processor 102 may associate different metadata with any of the motion data captured by motion sensor 112, including, for example, global positioning information, a time code, or any other suitable metadata (e.g., the current mode of device 100 or the types of applications being run by device 100 when the motion data was captured).

To enhance a user's experience interacting with electronic device 100, the electronic device may provide the user with an ability to generate useful device information by moving the electronic device (i.e., a motion sensor of the electronic device) in one of various ways. For example, motion sensor 112 may detect movement caused by a particular type of user motion event (e.g., a user shaking sensor 112 or a user walking with sensor 112), and sensor 112 may then generate a particular motion sensor data signal based on the detected movement. In some embodiments, motion sensor 112 may be a three-axis accelerometer, and the detected movement may include, for example, movement along one or more particular axes of the accelerometer caused by a particular user motion event (e.g., a tilting motion detected in a z-y plane, or a shaking motion detected along any of the accelerometer axes). Sensor 112 may then generate motion sensor data in response to the detected movement. Next, device 100 may analyze this generated motion sensor data for distinguishing a particular type of user motion event associated with the sensor data and for determining whether or not to perform a specific device operation based on the distinguished type of user motion event (e.g., using rules or settings provided by an application run by processor 102).

There may be various types of user motion events that can be detected by motion sensor 112 for generating motion sensor data to be analyzed by device 100. For example, user "input" motion events may be any suitable type of user motion event associated with a user attempting to actively interact with device 100, such as a user shaking or tilting sensor 112 to navigate a menu hierarchy of an application or to control the play of a video game being provided by device 100. Alternatively, user "step" motion events may be any suitable type of user motion event associated with a user attempting to have device 100 track his or her exercise efforts, such as a user walking or running with sensor 112 so that the amount of steps taken may be counted by device 100. Of course, other types of user motion events detectable by motion sensor 112 may not be intended by the user (e.g., when a user unintentionally bumps the device) or may not be caused by the user at all (e.g., when an earthquake moves the device).

Electronic device 100 may use any suitable approach or algorithm for analyzing and interpreting motion sensor data generated by motion sensor 112. Device 100 may analyze the motion sensor data to distinguish the particular type of user motion event that caused the movement detected by sensor 112 (e.g., by distinguishing between two or more different types of user motion event that may have caused the movement) and to determine whether or not to perform a specific device operation in response to the distinguished type of user motion event.

In some embodiments, processor 102 may load a motion sensing application (e.g., an application stored in memory 104 or provided to device 100 by a remote server via communications circuitry 106). The motion sensing application may provide device 100 with rules for utilizing the motion sensor data generated by sensor 112. For example, the rules may determine how device 100 analyzes the motion sensor data in order to distinguish the particular type of user motion event that caused the movement detected by sensor 112 (e.g., a user step event, a user input event, or perhaps an event not necessarily intended by the user (e.g., an unintentional motion)). For example, the motion sensing application may determine whether or not the particular type of user motion event that caused the movement detected by sensor 112 is associated with an intentional user input (e.g., a user step event or a user input event). Additionally or alternatively, the rules may determine how device 100 handles the distinguished type of motion event (e.g., whether or not device 100 changes a function or setting in response to detecting the distinguished type of motion event).

For example, device 100 may analyze generated motion sensor data to determine a specific user input motion event associated with the sensor data and may shuffle a media playlist, skip to a previous or next media item (e.g., song), change the volume of played back media, or perform any other suitable operation based on the determination. In some embodiments, electronic device 100 may be configured to allow a user's specific input motion event to navigate menus or access functions contextually based on currently displayed menus (e.g., on an output display component of I/O circuitry 110) or based on otherwise known states of the device. For example, electronic device 100 may display a "Now Playing" display, navigate a cover flow display (e.g., display a different album cover), scroll through various options, pan or scan to a radio station (e.g., move across preset radio stations when in a "radio" mode), or display a next media item (e.g., scroll through images) based on the analysis of a particular motion sensor data signal generated by motion sensor 112 in response to motion sensor 112 detecting a particular movement caused by a particular user input motion event (e.g., a shaking motion event or a tilting motion event).

Device 100 may be configured to handle user step motion events differently than user input motion events. For example, device 100 may analyze the generated motion sensor data to determine a specific user step motion event associated with the sensor data, may record the step event, and may then make various "exercise" determinations based on the step event, such as the current step count of the user, the distance traveled by the user, the pace of the user, and the like. In some embodiments, electronic device 100 may then use these step event exercise determinations to perform any suitable device operation, such as playing media having a tempo similar to the detected pace of the user.

Electronic device 100 can include different power management modes for controlling and managing power consumption by the components of the device and any periphery devices that may be coupled to the device. In particular, electronic device 100 can include one or more particular power management modes for reducing power consumption when the device is not connected to a remote power supply (e.g., when the electronic device is not plugged into a wall socket). For example, a particular power management mode of device 100 can prevent non-essential power intensive processes from being performed by the device while the device is being powered by a battery. In some embodiments, electronic device 100 can refrain from providing power to particular device components after a certain period of non-use. For example, electronic device 100 can turn off a hard drive (e.g., memory 104), dim or turn off a display (e.g., an output component of I/O circuitry 110), or place a processor (e.g., processor 102) in a low-power "sleep" or "hibernate" mode. Some or all of the power management settings can be set automatically or by a user of device 100 (e.g., the user may define the duration or condition before device 100 switches between particular power management modes).

Figure 2:
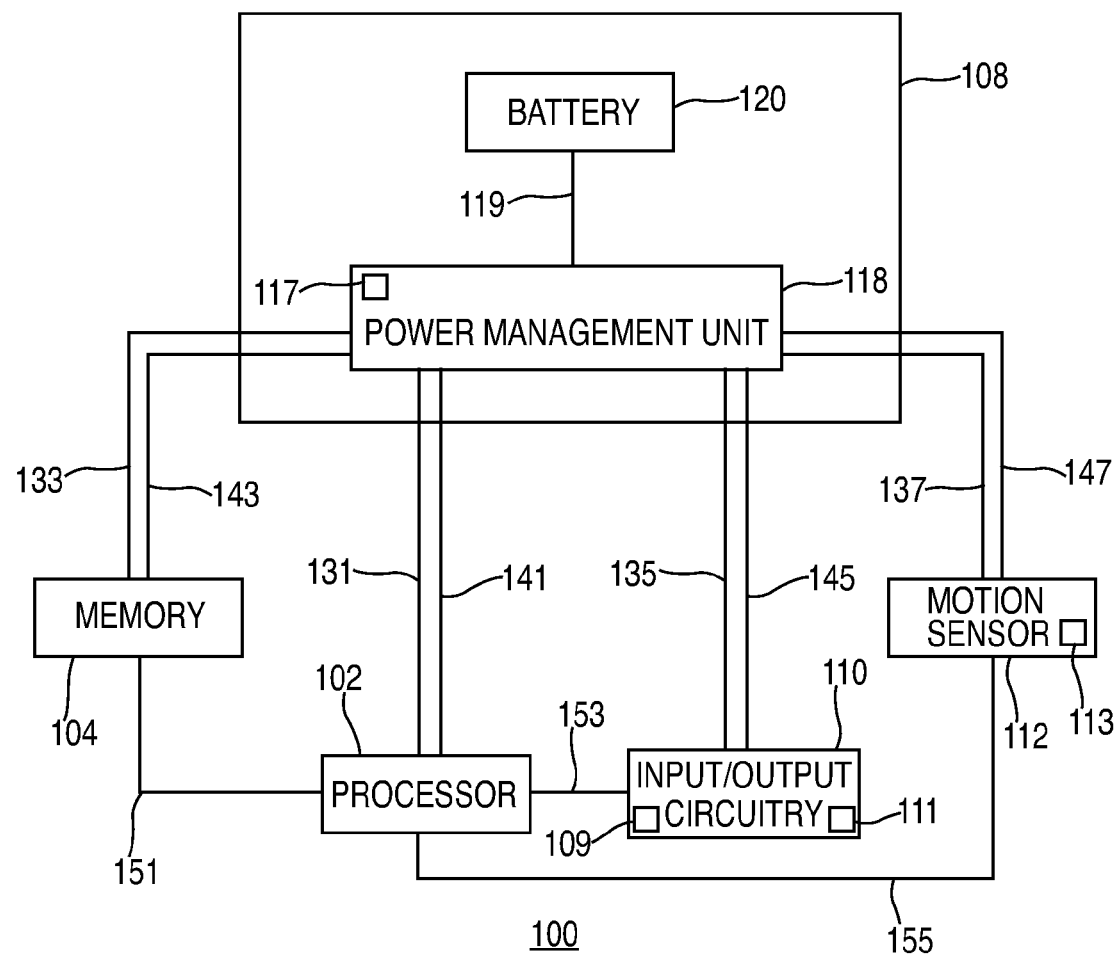
Figure 3A:
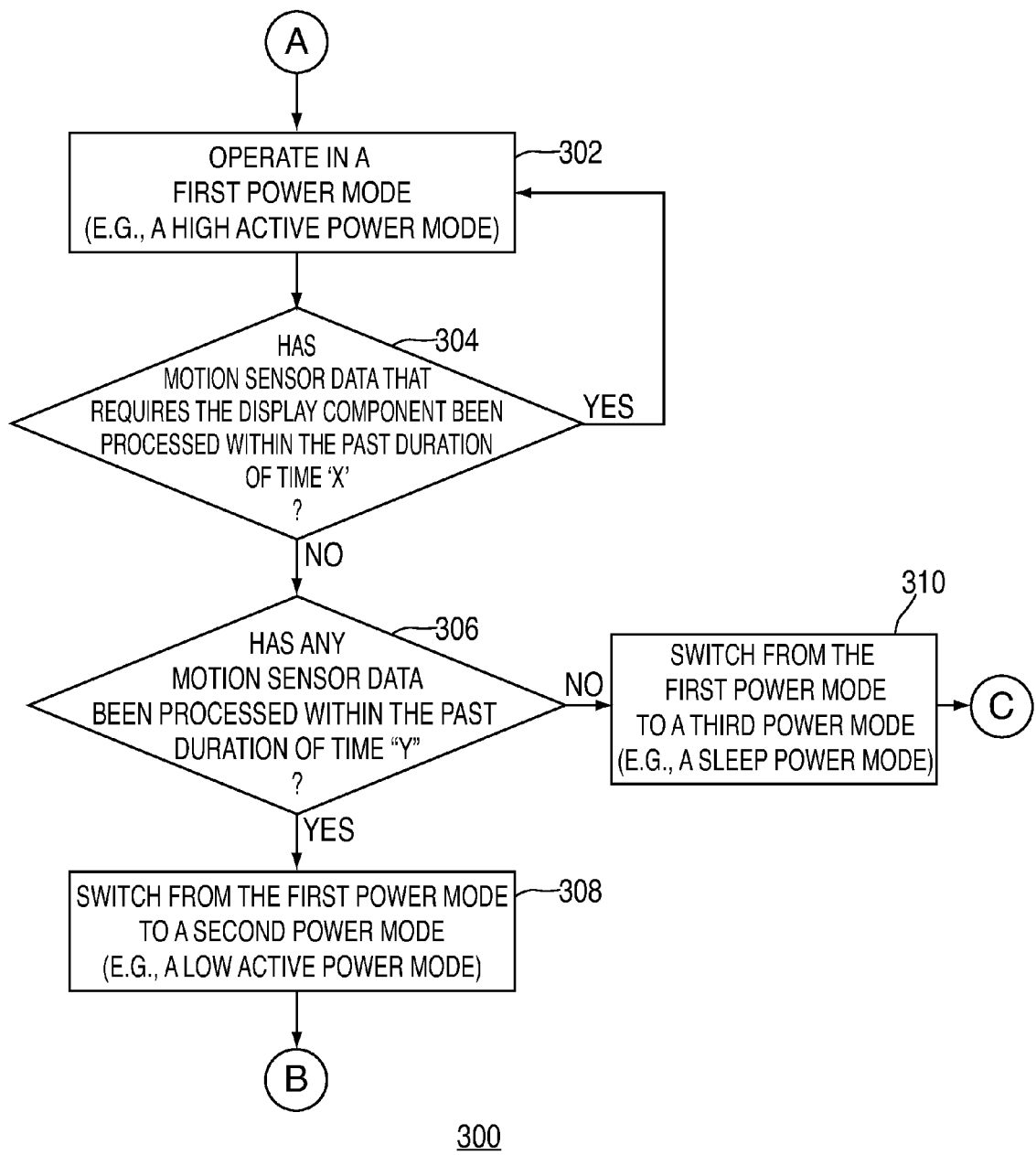
FIGS. 3A-3D are a flowchart of an illustrative process for processing motion sensor data using various power management modes in accordance with some embodiments of the invention.
Figure 3B:
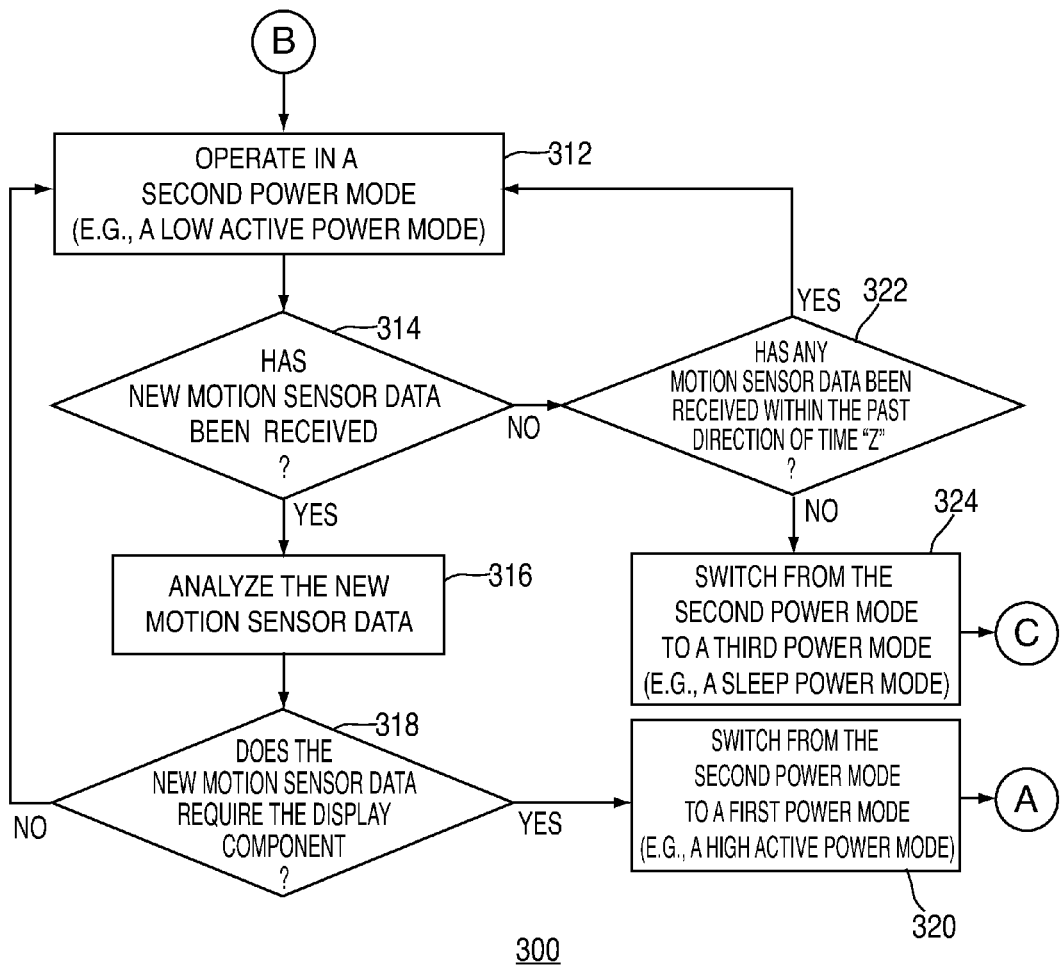
Figure 3C:
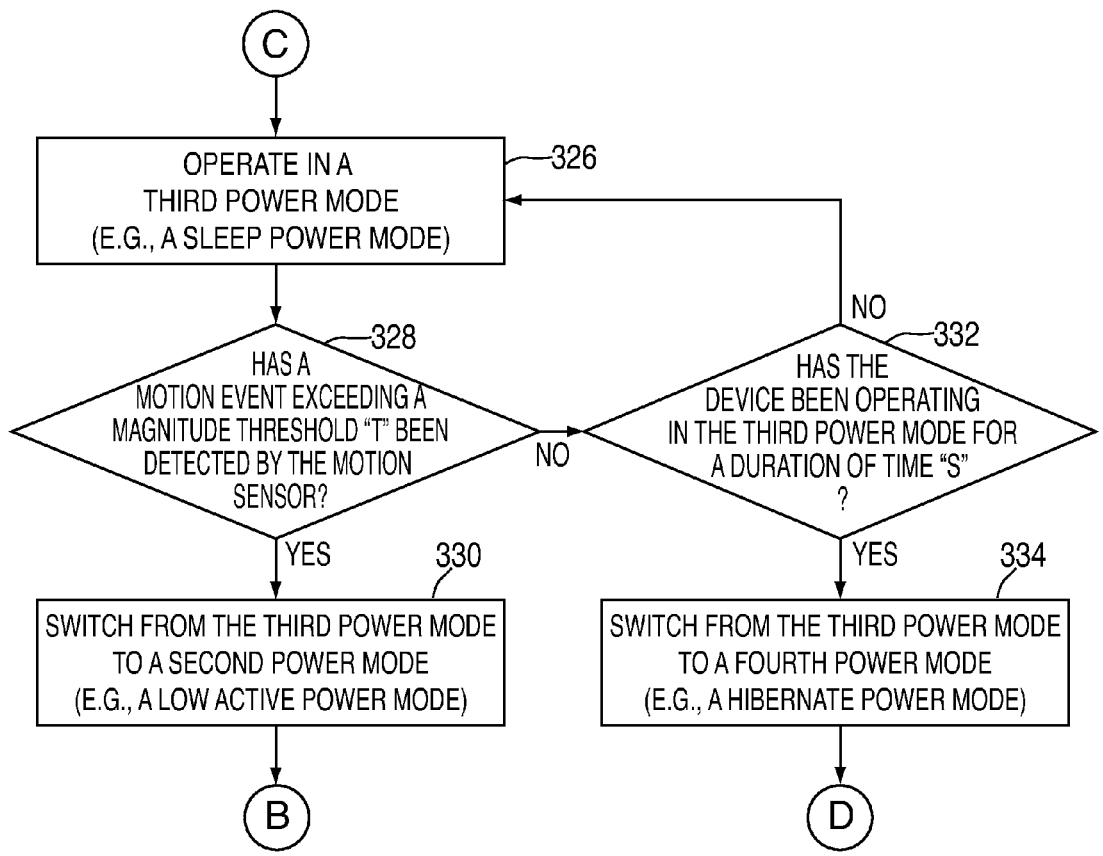
Figure 3D:
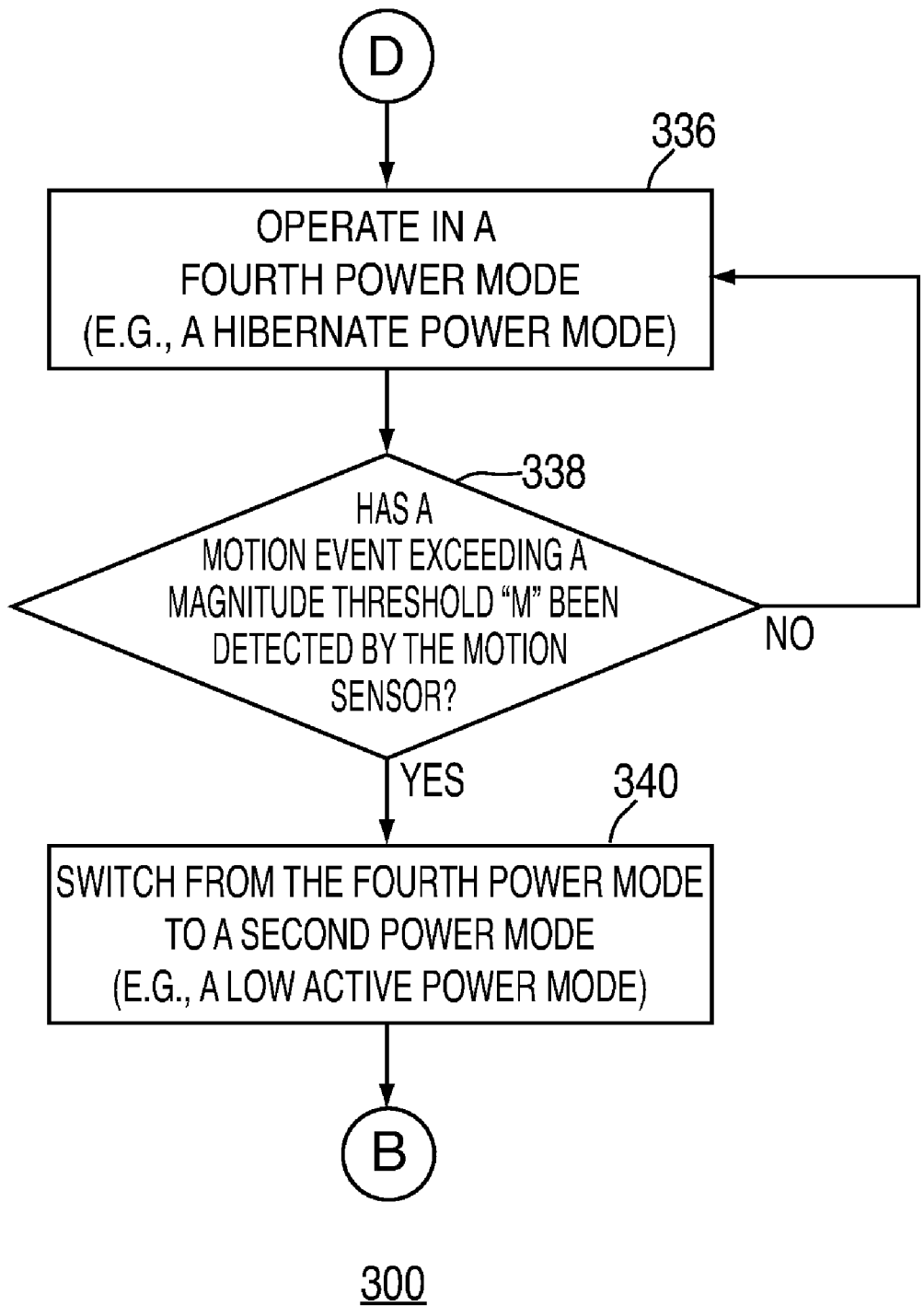

For example, as shown in FIG. 2, power supply component 108 of device 100 may include a power management unit ("PMU") 118 coupled to at least one source of power, such as battery 120 via PMU-battery power line 119. In some embodiments, PMU 118 may include a microcontroller and can be configured to govern the power functions of device 100. PMU 118 may include its own memory (e.g., loaded with software and/or firmware), processor with input/output functionality and timers, as well as one or more converters for measuring the power provided by battery 120. In some embodiments, PMU 118 may also include a backup power source that can power components of PMU 118 even when device 100 is completely shut down, such that, for example, the current time of a real-time clock is maintained. PMU 118 may be responsible for coordinating certain functions of device 100, including, but not limited to, monitoring power connections and battery charges, controlling power provided to other components of the device, shutting down certain components of the device when they are left idle or deemed to be currently unnecessary to properly operate the device, regulating a real-time clock of the device, and controlling various power management modes of the device.

As mentioned, PMU 118 may provide power and communicate other information to various components of device 100. For example, as shown in FIG. 2, PMU 118 may be able to provide power to processor 102 via a PMU-processor power line 131, to memory 104 via a PMU-memory power line 133, to I/O circuitry 110 via a PMU-I/O power line 135, and to motion sensor 112 via a PMU-sensor power line 137. PMU 118 may also exchange information with various components, such as with processor 102 via a PMU-processor data line 141, with memory 104 via a PMU-processor data line 143, with I/O circuitry 110 via a PMU-I/O data line 145, and with motion sensor 112 via a PMU-sensor data line 147, for example. Similarly, data may be exchanged between processor 102 and memory 104 via a processor-memory data line 151, between processor 102 and I/O circuitry 110 via a processor-I/O data line 153, and between processor 102 and motion sensor 112 via a processor-sensor data line 155. In some embodiments, certain power lines and data lines may be combined into a single communications line.

FIGS. 3(A-D) show a flowchart of an illustrative process 300 for utilizing motion sensor data in various power management modes to reduce the amount of power required by an electronic device. Process 300 may include two or more power management modes, each of which may be employed by an electronic device in certain situations. For example, as shown in FIG. 3, process 300 may provide for a device to operate in one of four different power management modes (e.g., a high active power mode at steps 302-310 of FIG. 3A, a low active power mode at steps 312-324 of FIG. 3B, a sleep power mode at steps 326-334 of FIG. 3C, and a hibernate power mode at steps 336-340 of FIG. 3D), although in other embodiments there may be more or fewer power management modes.

Process 300 is described with reference to the various device components of electronic device 100 of FIGS. 1 and 2, although any other suitable electronic device may operate according to the power mode management of process 300. Moreover, process 300 is often described with specific reference to a motion sensing application that may or may not require utilization of a display output component of I/O circuitry 110 of device 100, although process 300 may be followed by a device running any suitable application that may or may not use any suitable device component.

Because device 100 may be constantly switching between various power modes, process 300 may not have a distinct beginning and ending (e.g., device 100 may always be switching between power modes, may not always begin in the same mode, and may be turned off when in any of the modes). However, device 100 may begin in a high active mode (e.g., at step 302) when first turned on. For example, at step 302, an electronic device may be operating in a first power management mode, such as a high active power mode. In some embodiments, electronic device 100 may be operating in a high active power mode when power is being provided to some or all of the components of device 100. For example, with respect to FIG. 2, device 100 may be operating in a high active power mode when PMU 118 is providing power (e.g., from battery 120) to processor 102, memory 104, I/O circuitry 110, and motion sensor 112 via respective power lines 131, 133, 135, and 137.

While device 100 is operating in the high active power mode, one or more applications may be run by processor 102, such as an application loaded into processor 102 from memory 104 via data line 151. As mentioned, processor 102 may include any processing circuitry operative to control the operations and performance of electronic device 100. For example, processor 102 may be used to run operating system applications, firmware applications, media playback applications, media editing applications, or any other application. In some embodiments, processor 102 may receive input signals from an input component (e.g., a scroll wheel or touch screen) of I/O circuitry 110 and/or drive output signals through an output component (e.g., a display) of I/O circuitry 110. Processor 102 may load a user interface program (e.g., a program stored in memory 104 or another device or server) to determine how instructions or data received via an input component of I/O circuitry 110 or one or more motion sensors 112 may manipulate the way in which information is provided to the user via an output component of I/O circuitry 110.

For example, with respect to embodiments involving the use of motion sensor data generated by motion sensor 112, a motion sensing application (e.g., an application stored in memory 104 or provided to device 100 by a remote server via communications circuitry 106) may be run by processor 102 while device 100 operates in the high active power mode. The motion sensing application may provide device 100 with rules for processing the motion sensor data generated by sensor 112. For example, the rules may determine how device 100 analyzes the motion sensor data in order to distinguish the particular type of user motion event that caused the movement detected by sensor 112 (e.g., a user step event, a user input event, or perhaps an event not necessarily intended by the user (e.g., an unintentional motion event)). Additionally or alternatively, the rules may determine how device 100 handles the distinguished type of motion event (e.g., whether or not device 100 changes a function or setting of the device in response to detecting the distinguished type of motion event, such as updating a display screen presented to the user or updating the count of user steps detected). Therefore, at step 302, an application (e.g., a motion sensing application) may be run by processor 102 and processor 102 may analyze application inputs and determine appropriate application outputs.

For example, when in the high active power mode at step 302, processor 102 may be loaded with a motion sensing application and may receive application inputs, such as motion sensor data from sensor 112 via data line 155. Processor 102 may use the motion sensing application to analyze the motion sensor data in order to distinguish the particular type of user motion event that caused the movement detected by sensor 112. Then processor 102 may use the motion sensing application to determine how device 100 should handle the distinguished type of motion event. For example, processor 102 may distinguish from the motion sensor data a specific user input event (e.g., a tilting event), and processor 102 may also determine that the specific user input event requires that device 100 display a particular menu screen.

Therefore, processor 102 may generate the particular menu screen, for example, in conjunction with data provided by memory 104 via data line 151, and may then send that menu screen data to a display screen output component of I/O circuitry 110 (e.g., display output component 111 of FIG. 2) via data line 153 for display to the user.

It is to be understood that various other types of applications may also be run by processor 102 during the high active power mode and utilized at step 302. For example, user inputs generated by an input component of I/O circuitry 110 (e.g., keyboard input component 109 of FIG. 2) may also be received by processor 102 and used to dictate certain device responses. For example, when operating in the high active power mode or any of the other power modes of process 300, specific user inputs may be received that may instruct or require device 100 to switch to any other power management mode. For example, at any suitable point during process 300, device 100 may receive a user input associated with a user instruction to enter a sleep mode.

At certain points, however, device 100 may switch from the first power management mode (e.g., the high active power mode of step 302) to another type of power management mode. For example, it may be determined that one or more certain components of device 100 are not currently being utilized by the type or types of applications being run by processor 102. In some embodiments, it may be determined that processor 102 is running an application that does not currently require the use of display output component 111 of I/O circuitry 110. Therefore, device 100 may stop providing power to display output component 111, or may otherwise at least partially deactivate that output component, until it is determined that the output component may once again be required by processor 102.

Keeping with the specific example of a motion sensing application being used by processor 104, in order to determine whether or not a component (e.g., a display output component 111) is not currently required, process 300 may advance to step 304. At step 304, device 100 may determine whether or not motion sensor data has recently been distinguished by processor 102 as a motion event requiring use of display 111. For example, at step 304, it may be determined whether or not received motion sensor data that requires display 111 has been processed within the past duration of time "X" (e.g., whether or not display 111 has been altered based on received motion sensor data at any point within the last 5 minutes or any other suitable duration of time). The duration of time X may be any suitable duration of time for which the non-use of display 111, or any other suitable component, by the motion sensing application may trigger device 100 to exit its current power management mode (e.g., its high active power mode). If it is determined at step 304 that display 111 has been utilized by the motion sensing application of processor 102 within the past duration of time X, process 300 may return from step 304 back to the normal operation of device 100 within the high active power mode at step 302.

However, if it is determined at step 304 that display 111 has not been utilized by the motion sensing application of processor 102 within the past duration of time X, process 300 may proceed from step 304 to step 306. At step 306, it may be determined whether or not any motion sensor data has been processed by the motion sensing application of processor 102 within the past duration of time "Y". The duration of time Y may be any suitable duration of time for which the non-use of processor 102 for analyzing motion sensor data from sensor 112 may trigger device 100 to enter a particular new power management mode. Time Y may be less than, equal to, or greater than time X. Both time X and time Y may be defined by the motion sensing application, by other programs or components of device 100, by the user of device 100, or by any other suitable mechanism.

If it is determined at step 306 that processor 102 has analyzed certain motion sensor data within the past duration of time Y, process 300 may proceed to step 308, where device 100 may prepare to enter a second power management mode (e.g., a low active power mode). However, if it is determined at step 306 that processor 102 has not analyzed any motion sensor data within the past duration of time Y, process 300 may proceed to step 310, where device 100 may prepare to enter a third power management mode (e.g., a sleep power mode).

First, if process 300 proceeds from step 306 to step 308, processor 102 and a motion sensing application may still be actively processing motion sensor data (e.g., at least with respect to a cut-off frequency based on time Y), but may not be actively processing motion sensor data utilized for manipulating display 111 (e.g., at least with respect to a cut-off frequency based on time X). Therefore, at step 308, device 100 may prepare to enter a second power management mode (e.g., a low active power mode) by stopping to provide power to display 111 or by otherwise at least partially deactivating display 111 in order to reduce the power requirements of device 100. For example, PMU 118 may stop providing power to at least portions of display 111 via power line 135. Alternatively or additionally, processor 102 and/or PMU 118 may stop providing data to at least portions of display 111 via respective data lines 153 and 145. Process 300 may then proceed to step 312 of FIG. 3B, and the motion sensing application may continue to be run by processor 102 while device 100 operates in a low active power mode with display 111 at least partially deactivated.

Alternatively, if process 300 proceeds from step 306 to step 310, processor 102 and a motion sensing application may not be actively processing motion sensor data (e.g., at least with respect to a cut-off frequency based on time Y), and thus may not be actively processing motion sensor data utilized for manipulating display 111 or any other component of device 100. Therefore, at step 310, device 100 may prepare to enter a third power management mode (e.g., a sleep power mode) in order to reduce the power requirements of device 100 by stopping to provide power to at least a portion of display 111 or by otherwise at least partially deactivating display 111, as well as by at least partially deactivating some or all of the other components that may be active due to the motion sensing application. For example, at step 310, device 100 may prepare to enter the sleep power management mode by unloading the motion sensor application from processor 102 (e.g., via data line 151 back into memory 104), and by at least partially deactivating or powering down processor 102 and/or memory 104. PMU 118 may stop providing power to at least portions of processor 102 and/or memory 104 via respective power lines 131 and 133. Alternatively or additionally, PMU 118 may stop providing data to at least portions of processor 102 and/or memory 104 via respective data lines 141 and 143. Process 300 may then proceed to step 326 of FIG. 3C, and device 100 may operate in the sleep power mode.

Continuing now with device 100 operating in a low active power mode at step 312, processor 102 may be running the motion sensing application and may receive application inputs, such as motion sensor data from sensor 112 via data line 155. Step 312 may be similar to step 302 of FIG. 3A, but one or more components may be at least partially deactivated for reducing the power requirements of device 100 (e.g., display 111, as described with respect to step 308). At step 314, device 100 may determine whether or not new motion sensor data has been received by processor 102. If new motion sensor data has been received, process 300 may advance to step 316 and processor 102 may use the motion sensing application to analyze the motion sensor data in order to distinguish the particular type of user motion event that caused the movement detected by sensor 112. Processor 102 may then use the motion sensing application to determine how device 100 should handle the distinguished type of motion event and advance to step 318.

At step 318, device 100 may determine whether or not processor 102 has distinguished from the received motion sensor data (e.g., at step 316) a user motion event that requires utilization of one or more device components that are not appropriately activated in the current power management mode (i.e., the low active power mode). For example, device 100 may determine at step 318 whether or not processor 102 has distinguished a user motion event that requires utilization of display 111, such as a user motion event that is determined to require device 100 to display a particular menu screen on display 111. If it is determined at step 318 that processor 102 has distinguished from the new motion sensor data a user motion event that requires display 111, process 300 may proceed to step 320 and device 100 may prepare to enter first power management mode (e.g., high active power mode). However, if it is determined at step 318 that the motion event distinguished by processor 102 does not require display 111, process 300 may return to step 312 and device 100 may respond to the distinguished motion event while the device remains in its low active power mode.

First, if process 300 proceeds from step 318 to step 320, a motion sensing application and processor 102 may be actively distinguishing user motion events from received motion sensor data, but one or more particular device components required to respond to a certain distinguished user motion event (e.g., display 111) may not be properly activated. Therefore, at step 320, device 100 may prepare to enter the first power management mode (e.g., the high active power mode) by starting to provide power to display 111 or by otherwise at least partially activating display 111 in order to allow the motion sensing application to properly process the distinguished user motion event requiring utilization of display 111. For example, PMU 118 may begin providing power to at least portions of display 111 via power line 135. Alternatively or additionally, processor 102 and/or PMU 118 may start providing data to at least portions of display 111 via respective data lines 153 and 145. Process 300 may then proceed to step 302 of FIG. 3A, and the motion sensing application may continue to be run by processor 102 while device 100 operates in the high active power mode with display 111 activated for proper use by the motion sensing application.

Alternatively, if process 300 returns from step 318 to step 312, the motion sensing application and processor 102 may be actively distinguishing user motion events from received motion sensor data, but the one or more particular device components required to respond to the recently distinguished user motion event may already be appropriately activated in the current power management mode (i.e., the low active power mode). For example, device 100 may determine at step 318 that the recently distinguished user motion event does not require utilization of display 111, such as a user step motion event that may be determined by the motion sensing application only to require device 100 to update a counter indicative of the number of user steps that have been detected. Therefore, at step 312, the motion sensing application may continue to be run by processor 102 while device 100 remains operating in the low active power mode.

It is to be reiterated that process 300 is presented to describe specific embodiments for utilizing multiple power management modes with respect to a motion sensing application that may or may not utilize display 111. However, it is to be understood that process 300 may alternatively be followed for various other types of applications that may or may not use various other types of device components. Moreover, a motion sensing application may or may not use various other types of device components in addition to or as opposed to display 111. For example, various other components may be deactivated for entering the low active power mode at step 308 and it may be determined whether or not one or more of these other deactivated components are utilized by the distinguished motion event at step 318 and need to be reactivated at step 320. However, the specific embodiments relating to a motion sensing application and the optional use of display 111 are referenced only to more clearly describe the features of process 300.

However, if at step 314 it is determined that new motion sensor data has not been received by processor 102, process 300 may advance to step 322. At step 322, it may be determined whether or not any motion sensor data has been processed by the motion sensing application of processor 102 within the past duration of time "Z". The duration of time Z may be any suitable duration of time for which the non-use of processor 102 for analyzing motion sensor data from sensor 112 may trigger device 100 to enter a particular new power management mode. Time Z may be less than, equal to, or greater than time X of step 304 and/or time Y of step 306. Like time X and time Y, time Z may be defined by the motion sensing application, by other programs or components of device 100, by the user of device 100, or by any other suitable mechanism. If it is determined at step 322 that processor 102 has analyzed motion sensor data within the past duration of time Z, process 300 may return to step 312, where the motion sensing application may continue to be run by processor 102 while device 100 remains operating in the low active power mode.

However, if it is determined at step 322 that processor 102 has not analyzed any motion sensor data within the past duration of time Z, process 300 may proceed to step 324, where device 100 may prepare to enter a third power management mode (e.g., a sleep power mode or a standby power mode). For example, if process 300 proceeds from step 322 to step 324, processor 102 and a motion sensing application may not be actively processing motion sensor data (e.g., at least with respect to a cut-off frequency based on time Z), and thus may not still be actively processing motion sensor data utilized for manipulating display 111 or any other component of device 100. Therefore, at step 324, device 100 may prepare to enter the sleep power mode in order to reduce the power requirements of device 100 by at least partially deactivating some or all of the other components that may be active due to the motion sensing application. For example, at step 324, device 100 may prepare to enter the sleep power management mode by unloading the motion sensor application from processor 102 (e.g., via data line 151 back into memory 104), and by at least partially deactivating or powering down processor 102 and/or memory 104. PMU 118 may stop providing power to at least portions of processor 102 and/or memory 104 via respective power lines 131 and 133. Alternatively or additionally, PMU 118 may stop providing data to at least portions of processor 102 and/or memory 104 via respective data lines 141 and 143. Process 300 may then proceed to step 326 of FIG. 3C, and device 100 may operate in the sleep power mode.

Continuing now with device 100 operating in a sleep power mode at step 326, processor 102 may not be running a motion sensing application and at least portions of processor 102 may be deactivated. The sleep power mode may be a power mode that requires less, and often significantly less, power than the low active power mode. The sleep mode may save significant electrical consumption as compared to leaving many or all of the device components fully powered and idle, but may also allow the user to avoid having to reset programming codes or wait for the device to completely reboot. When operating in the sleep mode, device 100 may discontinue power to most of the device components (e.g., using PMU 118). However, certain components may still be activated in sleep mode, such as a RAM component of memory 104 that may be used to restore device 100 to its previous configuration once the sleep mode is exited. At least portions of PMU 118 may also remain activated during the sleep power mode such that device 100 may properly wake up from the sleep mode in response to certain events (e.g., a user input via input component 109 of I/O circuitry 110).

In some embodiments, one or more additional components may also remain activated during the sleep power mode. For example, at least portions of motion sensor 112 may remain active during the sleep power mode such that certain user motion events may be detected. PMU 118 may provide power to at least a portion of motion sensor 112 via power line 137. Alternatively or additionally, motion sensor 112 may be provided with its own independent source of power 113 (i.e., not battery 120 via PMU 118) that may allow at least portions of sensor 112 to remain activated during the sleep power mode or any other power management mode of device 100.

Process 300 may proceed to step 328 when device 100 is operating in the sleep power mode. At step 328, it may be determined whether or not motion sensor 112 has recently detected a motion event of a magnitude that exceeds a certain motion magnitude threshold "T". The magnitude of threshold T may be any suitable magnitude threshold above which the detected motion event may generate motion sensor data to be analyzed by a motion sensing application for potential device operation and thus may trigger device 100 to enter a particular new power management mode. Threshold T may be defined by motion sensor 112, by a motion sensing application, by other programs or components of device 100, by the user of device 100, or by any other suitable mechanism. Threshold T may be set to avoid processing minor incidental movements of motion sensor 112 but such that other types of movement of motion sensor 112 may be detected when device 100 is in the sleep mode and then properly analyzed.

If it is determined at step 328 that motion sensor 112 has recently detected a motion event of a magnitude that exceeds threshold T, process 300 may advance to step 330. Therefore, at step 330, device 100 may prepare to enter the second power management mode (e.g., the low active power mode) for analyzing with a motion sensing application the motion sensor data generated in response to the recently detected motion event. For example, motion sensor 112 may send a signal to PMU 118 (e.g., via power line 137 and/or data line 147) that may prompt PMU 118 to allow a proper motion sensing application to be loaded by device 100. For example, PMU 118 may provide data and/or power to at least portions of processor 102 via respective lines 131 and 141 and/or to at least portions of memory 104 via respective lines 133/143 in order for a proper motion sensing application to be loaded into processor 102. Moreover, a portion of memory 104 (e.g., a RAM component of memory 104 as described with respect to step 324) may be utilized to restore device 100 to its previous configuration before the sleep mode had been entered. Process 300 may then proceed to step 312 of FIG. 3B, where device 100 operates in the low active power mode and the motion sensing application may be run by processor 102 for analyzing (e.g., at step 316) the motion sensor data generated by motion sensor 112 in response to the motion event recently detected at step 328. In some embodiments, if this recently detected motion event is analyzed at step 316 to be an event not associated with an intentional user input, process 300 may return device 100 directly to the sleep mode.

However, if at step 328 it is determined that motion sensor 112 has not recently detected a motion event of a magnitude that exceeds threshold T, process 300 may advance to step 332. At step 332, it may be determined whether or not device 100 has been operating in the sleep mode for a duration of time "S". The duration of time S may be any suitable duration of time for which the non-detection of a motion event of a magnitude exceeding threshold T may trigger device 100 to enter a particular new power management mode, for example. Time S may be less than, equal to, or greater than time X of step 304, time Y of step 306, and/or time Z of step 322. Like times X, Y, and Z, time S may be defined by motion sensor 112, by a motion sensing application, by other programs or components of device 100, by the user of device 100, or by any other suitable mechanism. If it is determined at step 332 that device 100 has not yet been operating in the sleep mode for the duration of time S, process 300 may return to step 326 and device 100 may remain in the sleep mode.

However, if it is determined at step 332 that device 100 has been operating in the sleep mode for the duration of time S, process 300 may proceed to step 334, where device 100 may prepare to enter a fourth power management mode (e.g., a hibernate power mode). For example, if process 300 proceeds from step 332 to step 334, motion sensor 112 may not be actively detecting motion events of a magnitude that exceed threshold T (e.g., at least with respect to a cut-off frequency based on time S), and thus may be considered inactive with respect to the sleep power mode. Therefore, at step 334, device 100 may prepare to enter the hibernate power mode in order to reduce the power requirements of device 100 even more by deactivating some or all of the device components that may still be at least partially activated in the sleep power mode. For example, PMU 118 may stop providing power to a RAM component of memory 104 that may have been used to restore device 100 to its previous configuration once the sleep mode is exited (e.g., as described with respect to step 324 and step 330). However, before that is done, at least portions of the contents of the RAM may be written to a non-volatile storage portion of memory 104 as a file or a separate partition such that device 100 may properly be restored from the hibernate mode in response to certain events (e.g., a user input via input component 109 of I/O circuitry 110). Process 300 may then proceed to step 336 of FIG. 3D, and device 100 may operate in the hibernate power mode.

Continuing now with device 100 operating in a hibernate power mode at step 336, PMU 118 may not be activating at least a portion of RAM, for example, and the hibernate power mode may be a power mode that requires even less power than the sleep power mode. In some embodiments, at least a portion of PMU 118 may remain activated during the hibernate power mode such that device 100 may properly wake up from the hibernate mode in response to certain events (e.g., a user input via input component 109 of I/O circuitry 110).

In some embodiments, one or more additional components may also remain activated during the hibernate power mode. For example, at least portions of motion sensor 112 may remain active during the hibernate power mode such that certain user motion events may still be detected. PMU 118 may provide power to at least a portion of motion sensor 112 via power line 137. Alternatively or additionally, motion sensor 112 may be provided with its own independent source of power 113 (i.e., not battery 120 via PMU 118) that may allow at least portions of sensor 112 to remain activated during the hibernate power mode or any other power management mode of device 100.

Process 300 may proceed to step 338 when device 100 is operating in the hibernate power mode. At step 338, it may be determined whether or not motion sensor 112 has recently detected a motion event of a magnitude that exceeds a certain motion magnitude threshold "M". In some embodiments, motion sensor 112 and PMU 118 may be the only components of device 100 that are not completely deactivated in the hibernate power mode (e.g., processor 102 may be completely deactivated and no software applications may be running in the hibernate power mode). Therefore, only sensor 112 itself may be able to determine whether or not it has detected a motion event of a magnitude that exceeds threshold M. Moreover, in some embodiments, motion sensor 112 may only be provided with enough power in hibernate power mode to detect motion events of a magnitude that exceeds threshold M, but not enough power to correctly log all the motion parameters detected, for example. Therefore, in response to detecting a motion event of a magnitude that exceeds threshold M, motion sensor 112 may generate a "wake up" signal and transmit such a signal to PMU 118 (e.g., via line 137 and/or line 147). In response to receiving such a signal, PMU 118 may wake up other portions of device 100 to analyze motion sensor data generated in response to the motion event that woke up the PMU unit.

The magnitude of threshold M may be any suitable magnitude threshold above which motion events may be detected and thus may trigger device 100 to enter a particular new power management mode (e.g., by triggering motion sensor 112 to generate and transmit a wake up signal to PMU 118). Threshold M may be less than, equal to, or greater than threshold T of step 328, and threshold M may be defined by motion sensor 112, by a motion sensing application, by other programs or components of device 100, by the user of device 100, or by any other suitable mechanism. Threshold M may be set to avoid processing minor incidental movements of motion sensor 112 but such that other types of movement of motion sensor 112 may be detected when device 100 is in the hibernate mode and then properly analyzed.

If it is determined at step 338 that motion sensor 112 has recently detected a motion event of a magnitude that exceeds threshold M (e.g., if motion sensor 112 has generated and transmitted a wake up signal to PMU 118), process 300 may advance to step 340. Therefore, at step 340, device 100 may prepare to enter the second power management mode (e.g., the low active power mode) for analyzing with a motion sensing application the motion sensor data generated in response to the recently detected motion event. For example, motion sensor 112 may send a wake up signal to PMU 118 (e.g., via power line 137 and/or data line 147) that may prompt PMU 118 to allow a proper motion sensing application to be loaded by device 100. In response to receiving such a wake up signal, for example, PMU 118 may provide data and/or power to at least portions of processor 102 via respective lines 131 and 141 and/or to at least portions of memory 104 via respective lines 133/143 in order for a proper motion sensing application to be loaded into processor 102.

Moreover, a portion of memory 104 (e.g., a file or a separate partition of a non-volatile storage portion of memory 104 as described with respect to step 334) may be utilized to restore device 100 to its previous configuration before the hibernate mode had been entered. Process 300 may then proceed to step 312 of FIG. 3B, where device 100 operates in the low active power mode and the motion sensing application may be run by processor 102 for analyzing (e.g., at step 316) the motion sensor data generated by motion sensor 112 in response to the motion event recently detected at step 338. In some embodiments, if this recently detected motion event is analyzed at step 316 to be an event not associated with an intentional user input, process 300 may return device 100 directly to the hibernate mode.

However, if at step 338 it is determined that motion sensor 112 has not recently detected a motion event of a magnitude that exceeds threshold M, process 300 may return to step 336 and device 100 may remain in the hibernate mode.

It is understood that the steps shown in process 300 of FIGS. 3A-3D are merely illustrative and that existing steps may be modified or omitted, additional steps may be added, and the order of certain steps may be altered.

As mentioned, when switching to the low active power mode either from the sleep power mode (e.g., at step 330) or from the hibernate power mode (e.g., at step 340), motion sensor 112 may send a signal to PMU 118 that may prompt PMU 118 to allow a proper motion sensing application to be loaded by device 100. For example, PMU 118 may provide data and/or power to at least portions of processor 102 and/or to at least portions of memory 104 in order for a proper motion sensing application to be loaded into processor 102. In some embodiments, when a motion sensing application or various other types of applications are loaded and run by processor 102, the application may provide device 100 with rules for initially or automatically or otherwise activating one or more device components. For example, when a motion sensing application is initially loaded into processor 102, the motion sensing application may be configured to instruct device 100 to activate display output component 111 of I/O circuitry 110.

However, in order for device 100 to operate in the low power mode, in accordance with some embodiments, display 111 should remain at least partially deactivated. Therefore, when switching to the low active power mode either from the sleep power mode (e.g., at step 330) or from the hibernate power mode (e.g., at step 340), motion sensor 112 may send a signal to PMU 118 (e.g., via power line 137 and/or data line 147) that may prompt PMU 118 to allow a proper motion sensing application to be loaded by device 100 while also providing motion sensing application with information for maintaining at least a portion of display 111 deactivated. For example, when switching to the low active power mode either from the sleep power mode or from the hibernate power mode, motion sensor 112 may send a flag signal to PMU 118 that may set a flag in a flag register of PMU 118 (e.g., flag register 117 of PMU 118 of FIG. 2). This flag signal may also prompt PMU 118 to allow the proper motion sensing application to be loaded by device 100. Alternatively, this flag signal may be a different signal than a signal sent by motion sensor 112 for prompting PMU 118 to allow the proper motion sensing application to be loaded by device 100. Flag register 117 may be any suitable type of register provided by PMU 118, such as a scratch register.

Once PMU 118 is prompted to direct the motion sensing application to be loaded, processor 102 may detect the status of flag register 117 of PMU 118 (e.g., via line 131 and/or line 141) and may determine whether or not to selectively ignore a rule of the motion sensing application instructing processor 102 to activate display 111. Moreover, when switching from the low active power mode either to the high active power mode (e.g., at step 320) or to the sleep power mode (e.g., at step 324), flag register 117 may be cleared. Therefore, when switching to the low active power mode, motion sensor 112 may provide device 100 with the ability to selectively ignore certain instructions of a motion sensing application loaded into processor 102 in order to maintain certain components at least partially deactivated in the low power management mode.

In some embodiments, a process for utilizing motion sensor data in various power management modes may avoid operating in an active power mode for processing all usable motion sensor data. For example, once a particular motion event or set of motion events is distinguished by a motion sensing application at a consistent rate for a particular period of time, a device may enter an inactive power mode (e.g., a sleep or hibernate mode) and may only enter an active power mode (e.g., a high active power mode or a low active power mode) to analyze motion sensor data during certain intervals of time. If a motion sensing application has detected user step motion events that consistently indicate that a user is walking at a particular rate (e.g., 60 steps per minute), the device may stop analyzing all generated motion sensor data and may enter an inactive power mode. The device may then re-enter an active power mode at particular intervals (e.g., for 15 seconds every minute) to analyze the motion sensor data generated during that interval. If the sensor data analyzed during that interval also indicates that the user is walking at the same particular rate (e.g., if 15 steps are detected during that 15 second interval), the motion sensor application may proceed as if it had analyzed sensor data for the entire minute and may act accordingly. For example, device 100 may record that the user has taken 60 steps in the past minute, even though the motion sensing application may have only detected the 15 steps taken during the last 15 seconds of that minute. This may allow the device to operate in an active mode for only 15 seconds out of a minute and in an inactive mode for 45 seconds out of the minute, while recording or otherwise operating in response to motion events that may occur during the entire minute.

Figure 4:
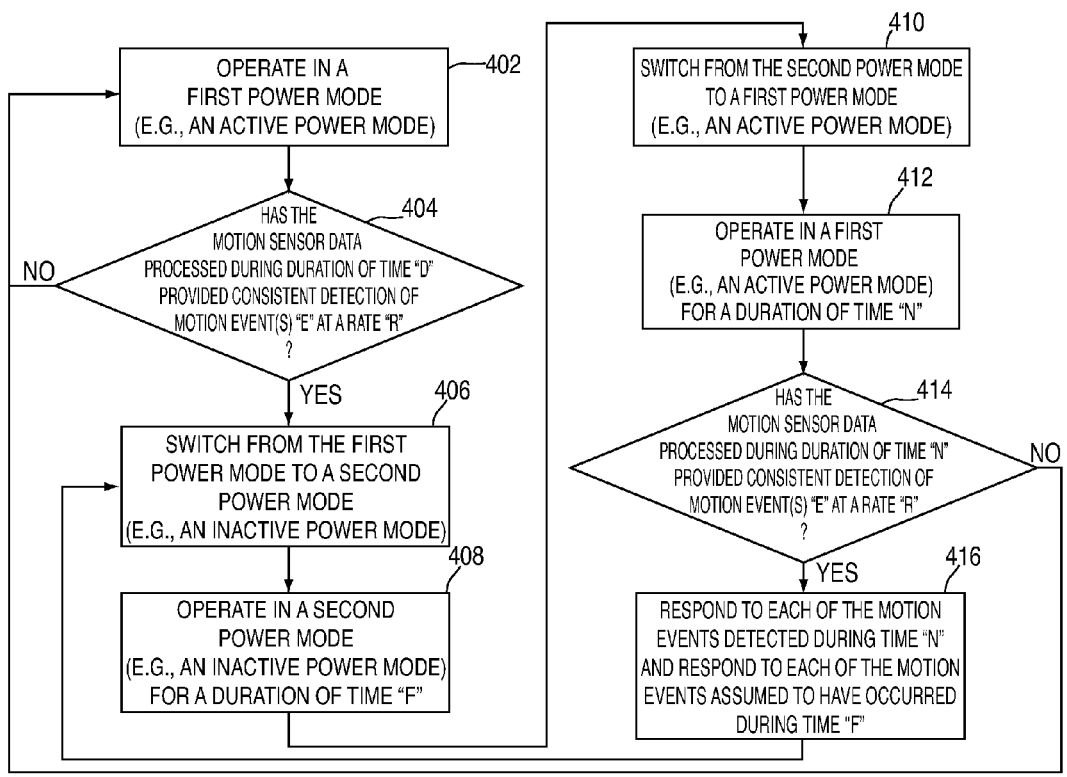
FIG. 4 is a flowchart of an other illustrative process for processing motion sensor data using various power management modes in accordance with some embodiments of the invention.

FIG. 4 shows a flowchart of an illustrative process 400 for utilizing motion sensor data in various power management modes to reduce the amount of power required by an electronic device based on consistent detection of a particular motion event. Process 400 may include two or more power management modes, each of which may be employed by an electronic device in certain situations. For example, as shown in FIG. 4, process 400 may provide for a device to operate in one of two different power management modes (e.g., an active power mode (e.g., at steps 402-406 and 412-416) and an inactive power mode (e.g., at steps 408 and 410) of FIG. 4, although in other embodiments there may be more or fewer power management modes.

Process 400 is described with reference to the various device components of electronic device 100 of FIGS. 1 and 2, although any other suitable electronic device may operate according to the power mode management of process 400. Moreover, process 400 is often described with specific reference to a motion sensing application that may detect user stepping motion events, although process 400 may be followed by a device running any suitable application for detecting any suitable motion event.

Because device 100 may be constantly switching between various power modes, process 400 may not have a distinct beginning and ending (e.g., device 100 may always be switching between power modes, may not always begin in the same mode, and may be turned off when in any of the modes). However, device 100 may begin in an active mode (e.g., at step 402) when first turned on. For example, at step 402, an electronic device may be operating in a first power management mode, such as an active power mode. The active power mode of process 400 may be similar to both the high active power mode and the low active power mode of process 300. For example, with respect to embodiments involving the use of motion sensor data generated by motion sensor 112, a motion sensing application (e.g., an application stored in memory 104 or provided to device 100 by a remote server via communications circuitry 106) may be run by processor 102 while device 100 operates in the active power mode of process 400. Certain device components may be at least partially deactivated in the active power mode of process 400 (e.g., as display 111 may be at least partially deactivated in the low active power mode of process 300).

At certain points, however, device 100 may switch from the active power mode to another type of power management mode. For example, it may be determined that the motion sensor data processed during a certain interval of time has provided the same user motion events at a consistent rate. For example, it may be determined from the processed motion sensor data that a user has been taking steps at a consistent rate for a certain period of time. Therefore, the device may be wasting power resources by constantly analyzing motion sensor data that has become consistent and predictable.

Keeping with the specific example of a motion sensing application being used by processor 104, in order to determine whether or not the processed motion sensor data is providing consistent results, process 400 may advance to step 404. At step 404, device 100 may determine whether or not the processed motion sensor data has provided consistent detection of a certain motion event or a certain set of motion events "E" occurring at a rate "R" for at least a particular duration of time "D". The duration of time D may be any suitable duration of time during which detection of a certain motion event E at a consistent rate R may trigger device 100 to exit its current power management mode (e.g., its active power mode). Similarly, the rate "R" may be any suitable rate at which consistent detection of a certain motion event E over a duration of time D may trigger device 100 to exit its current active power management mode.

Both rate R and time D may be defined by the motion sensing application, by other programs or components of device 100, by the user of device 100, or by any other suitable mechanism. The motion event or set of motion events E may be any suitable motion event, such as a stepping motion event or set of stepping motion events (e.g., a left foot lifting motion event and a right foot landing motion event). If it is determined at step 404 that the processed motion sensor data has not provided consistent detection of motion events E occurring at a rate R for at least a particular duration of time D, process 400 may return from step 404 back to the normal operation of device 100 within the active power mode at step 402.

However, if it is determined at step 404 that the processed motion sensor data has provided consistent detection of motion events E occurring at a rate R for at least a particular duration of time D, process 400 may proceed from step 404 to step 406. At step 406, device 100 may prepare to enter a second power management mode (e.g., an inactive power mode). The inactive power mode of process 400 may be similar to the sleep mode or the hibernate mode of process 300. Device 100 may prepare to enter the inactive power mode at step 406 of process 400 in order to reduce the power requirements of device 100 by at least partially deactivating some or all of the device components that may be active due to the motion sensing application in the active power mode. For example, at step 406, device 100 may prepare to enter the inactive power management mode by unloading the motion sensor application from processor 102 (e.g., via data line 151 back into memory 104), and by at least partially deactivating or powering down processor 102 and/or memory 104. PMU 118 may stop providing power to at least portions of processor 102 and/or memory 104 via respective power lines 131 and 133. Alternatively or additionally, PMU 118 may stop providing data to at least portions of processor 102 and/or memory 104 via respective data lines 141 and 143. Process 400 may then proceed to step 408, and device 100 may operate in the inactive power mode.

At step 408, device 100 may operate in the inactive power mode for a duration of time "F". Then, process 400 may proceed to step 410 where device 100 may prepare to reenter the active power mode for continuing to analyze with a motion sensing application the motion sensor data being generated by motion sensor 112. For example, PMU 118 may allow a proper motion sensing application to be loaded by device 100 at step 410. For example, PMU 118 may provide data and/or power to at least portions of processor 102 via respective lines 131 and 141 and/or to at least portions of memory 104 via respective lines 133/143 in order for a proper motion sensing application to be loaded into processor 102. Process 400 may then proceed to step 412, where device 100 may operate in the active power mode for a duration of time "N" and the motion sensing application may be run by processor 102 for processing the motion sensor data generated by motion sensor 112.

Process 400 may then proceed from step 412 to step 414. At step 414, device 100 may determine whether or not the motion sensor data processed during the past duration of time N has provided consistent detection of the motion events E occurring at the rate R (i.e., the same motion events E and the same rate R as described with respect to step 404). The duration of time N may be at least equal to any suitable duration of time during which a determination of consistent detection of motion events E at rate R may be made. If it is determined at step 414 that the processed motion sensor data has not provided consistent detection of motion events E occurring at rate R during the past duration of time N, process 400 may return back to the normal operation of device 100 within the active power mode at step 402. This may occur if motion events E are detected to occur at a rate not substantially similar to R or if other types of motion events not substantially similar to events E are detected.

However, if it is determined at step 414 that the motion sensor data processed during the past duration of time N has provided consistent detection of motion events E occurring at rate R, process 400 may proceed from step 414 to step 416. At step 416, device 100 may not only respond to each one of the number of motion events E detected during time N at rate R, but device 100 may also respond to the number of motion events E assumed to have occurred at rate R during time F (i.e., the duration of time that device 100 operated in the inactive power mode at step 408). For example, the number of motion events E detected during time N may equal the product of time N and rate R, and the number of motion events E assumed to have occurred at rate R during time F may equal the product of time F and rate R.

For example, if 15 user stepping events E were detected during a time N equal to 15 seconds (i.e., such that rate R equals one step per second), and time F equals 45 seconds, the number of motion events E assumed to have occurred at rate R during time F would be 45 (i.e., the product of 45 seconds and the rate of 1 step per second). Therefore, device 100 may operate at step 416 as if 60 user stepping events E were detected during the previous 60 seconds (i.e., the duration of time equal to N+F, which may be the duration of time for process 400 to advance from step 406 to step 414). In some embodiments, the motion sensing application may be configured to direct device 100 at step 416 to store this step count in a counter for later use. In other embodiments, the motion sensing application may be configured to direct device 100 at step 416 to display this step count to a user (e.g., on display 111). Time F of step 408 may be less than, equal to, or greater than time N of step 412. Times N and F may be defined by motion sensor 112, by a motion sensing application, by other programs or components of device 100, by the user of device 100, or by any other suitable mechanism. More power may be conserved using the power mode management of process 400 as time F is increased with respect to time N. That is, the longer device 100 is operating in the inactive mode as compared to the amount of time device is operating in the active mode, more power may be conserved. After step 416, process 400 may return to step 406 and steps 406-414 may be repeated.

It is understood that the steps shown in process 400 of FIG. 4 are merely illustrative and that existing steps may be modified or omitted, additional steps may be added, and the order of certain steps may be altered.

The processes described with respect to FIGS. 3A-3D and 4, as well as any other aspects of the invention, may each be implemented by software, but can also be implemented in hardware or a combination of hardware and software. They each may also be embodied as computer readable code recorded on a computer readable medium. The computer readable medium may be any data storage device that can store data which can thereafter be read by a computer system. Examples of the computer readable medium include read-only memory, random-access memory, flash memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for controlling power consumption of an electronic device, the method comprising:
   processing first motion sensor data for a first duration of time during a first active power mode of the device;
   detecting that the first processed motion sensor data identifies a first motion event occurring a first number of times during the first duration of time at a first rate;
   switching from the first active power mode to a first inactive power mode of the device in response to the detecting;
   returning from the first inactive power mode to the first active power mode after a second duration of time;
   processing second motion sensor data for a third duration of time;
   determining that the second processed motion sensor data identifies the first motion event occurring a second number of times during the third duration of time at the first rate; and
   responding to a third number of the first motion event, wherein the third number equals the second number plus the product of the second duration of time and the rate.

2. The method of claim 1, wherein the second duration of time is longer than the third duration of time.

3. The method of claim 1, wherein the first motion event is a user stepping event.

4. The method of claim 3, wherein the responding comprises storing the third number in a counter indicative of the amount of steps taken by a user of the device.

5. The method of claim 1, wherein the switching comprises:
   unloading a motion sensing application from a processor of the device; and
   deactivating at least a portion of the processor.

6. The method of claim 1, wherein the detecting comprises detecting that the first processed motion sensor data identifies the first motion event occurring the first number of times at a consistent rate for the first duration of time, and wherein the first rate is the consistent rate.

7. The method of claim 1, wherein the determining comprises determining that the second processed motion sensor data identifies the first motion event occurring the second number of times at a consistent rate for the third duration of time, and wherein the first rate is the consistent rate.

8. The method of claim 1, wherein the first motion event comprises a foot lifting motion event and a foot landing motion event.

9. The method of claim 1, wherein the device uses less power when operating in the first active power mode than when operating in the first inactive power mode.

10. The method of claim 1, wherein the responding comprises displaying the third number to a user of the device.

11. The method of claim 1, further comprising, before the switching, responding to the first number of the first motion event.

12. The method of claim 1, wherein the processing the first motion sensor data, the detecting, the switching, the returning, the processing the second motion sensor data, the determining, and the responding are performed by the device.

13. The method of claim 1, wherein the device is unable to process motion sensor data while the device is operating in the first inactive power mode.

14. Non-transitory computer-readable media for controlling an electronic device, comprising computer-readable code recorded thereon for:
   processing first motion sensor data for a first duration of time during a first active power mode of the device;
   detecting that the first processed motion sensor data identifies a first motion event occurring a first number of times during the first duration of time at a first rate;
   switching from the first active power mode to a first inactive power mode of the device in response to the detecting;
   returning from the first inactive power mode to the first active power mode after a second duration of time;
   processing second motion sensor data for a third duration of time;
   determining that the second processed motion sensor data identifies the first motion event occurring a second number of times during the third duration of time at the first rate; and
   responding to a third number of the first motion event, wherein the third number equals the second number plus the product of the second duration of time and the rate.

15. The non-transitory computer-readable media of claim 14, wherein the second duration of time is longer than the third duration of time.

16. The non-transitory computer-readable media of claim 14, wherein the first motion event is a user stepping event.

17. The non-transitory computer-readable media of claim 16, wherein the responding comprises storing the third number in a counter indicative of the amount of steps taken by a user of the device.

18. The non-transitory computer-readable media of claim 14, wherein the switching comprises:
   unloading a motion sensing application from a processor of the device; and
   deactivating at least a portion of the processor.

19. The non-transitory computer-readable media of claim 14, wherein the detecting comprises detecting that the first processed motion sensor data identifies the first motion event occurring the first number of times at a consistent rate for the first duration of time, and wherein the first rate is the consistent rate.

20. The non-transitory computer-readable media of claim 14, wherein the determining comprises determining that the second processed motion sensor data identifies the first motion event occurring the second number of times at a consistent rate for the third duration of time, and wherein the first rate is the consistent rate.

21. The non-transitory computer-readable media of claim 14, wherein the first motion event comprises a foot lifting motion event and a foot landing motion event.

22. The non-transitory computer-readable media of claim 14, wherein the device uses less power when operating in the first active power mode than when operating in the first inactive power mode.

23. The non-transitory computer-readable media of claim 14, wherein the responding comprises displaying the third number to a user of the device.

24. The non-transitory computer-readable media of claim 14, further comprising additional computer-readable code recorded thereon for, before the switching, responding to the first number of the first motion event.

25. The non-transitory computer-readable media of claim 14, wherein the device is unable to process motion sensor data while the device is operating in the first inactive power mode.

26. A method for controlling an electronic device, the method comprising:
   processing first motion sensor data from a motion sensor for a first duration of time while the device is operating in a first active power mode of the device;

detecting that the first processed motion sensor data identifies a first motion event occurring a first number of times during the first duration of time at a first rate;

switching from the first active power mode to a first inactive power mode of the device in response to the detecting;

after the switching, operating the device in the first inactive power mode of the device for a second duration of time;

after the operating, returning from the first inactive power mode to the first active power mode;

after the returning, processing second motion sensor data from the motion sensor for a third duration of time while the device is operating in the first active power mode of the device;

determining that the second processed motion sensor data identifies the first motion event occurring a second number of times during the third duration of time at the first rate; and in response to the determining, responding to a third number of the first motion event, wherein the third number equals the second number plus the product of the second duration of time and the first rate.

* * * * *